(12) United States Patent
Hörmann et al.

(10) Patent No.: US 6,564,920 B2
(45) Date of Patent: May 20, 2003

(54) DRIVER DISK FOR A CLUTCH PLATE

(75) Inventors: Karl Hörmann, Langdorf (DE);
Andreas Dorsch, Gerolzhofen (DE);
Carmen Schleicher, Wonfurt (DE);
Alfred Schraut, Waigolshausen (DE);
Klaus Steinel, Bergrheinfeld (DE);
Norbert Lohaus, Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/732,642

(22) Filed: Dec. 8, 2000

(65) Prior Publication Data

US 2001/0006142 A1 Jul. 5, 2001

(30) Foreign Application Priority Data

Dec. 10, 1999 (DE) .......................... 199 64 129

(51) Int. Cl.⁷ .............................. F16D 13/64
(52) U.S. Cl. ................. 192/200; 192/107 C; 192/212
(58) Field of Search .................. 192/52.3, 52.6, 192/107 C, 107 R, 200, 212

(56) References Cited

U.S. PATENT DOCUMENTS

| 1,868,543 A | * | 7/1932 | Salzman | 192/107 C |
| 2,195,666 A | * | 4/1940 | Wolfram | 192/107 C |
| 2,222,507 A | * | 11/1940 | Hunt | 192/107 C |
| 2,283,112 A | * | 5/1942 | Wemp | 192/107 C |
| 2,299,028 A | * | 10/1942 | Nutt et al. | 192/107 C |
| 2,448,880 A | * | 9/1948 | Gamble | 192/107 C |
| 2,658,598 A | * | 11/1953 | Thelander | 192/107 C |
| 3,587,803 A | * | 6/1971 | Sugiura et al. | 192/107 C |
| 4,202,432 A | * | 5/1980 | Komori | 192/107 C |
| 5,413,202 A | * | 5/1995 | Maucher | 192/107 C |
| 5,419,422 A | * | 5/1995 | Schraut | 192/107 R |

FOREIGN PATENT DOCUMENTS

| DE | 4220439 A1 | * | 1/1993 |
| DE | 4335674 A1 |   | 4/1994 |
| GB | 2165323 A | * | 4/1986 |

* cited by examiner

Primary Examiner—Rodney H. Bonck
(74) Attorney, Agent, or Firm—Cohen, Pontani, Lieberman & Pavane

(57) ABSTRACT

A facing carrier of a driver disk for a clutch plate includes a plurality of segments situated at a slight distance from one another around a circumference of a reinforcement part. The segments are pretensioned against the reinforcement part during assembly and welded thereto. The spacing of the segments allows uniform pretensioning of the segments against the reinforcement part.

13 Claims, 2 Drawing Sheets

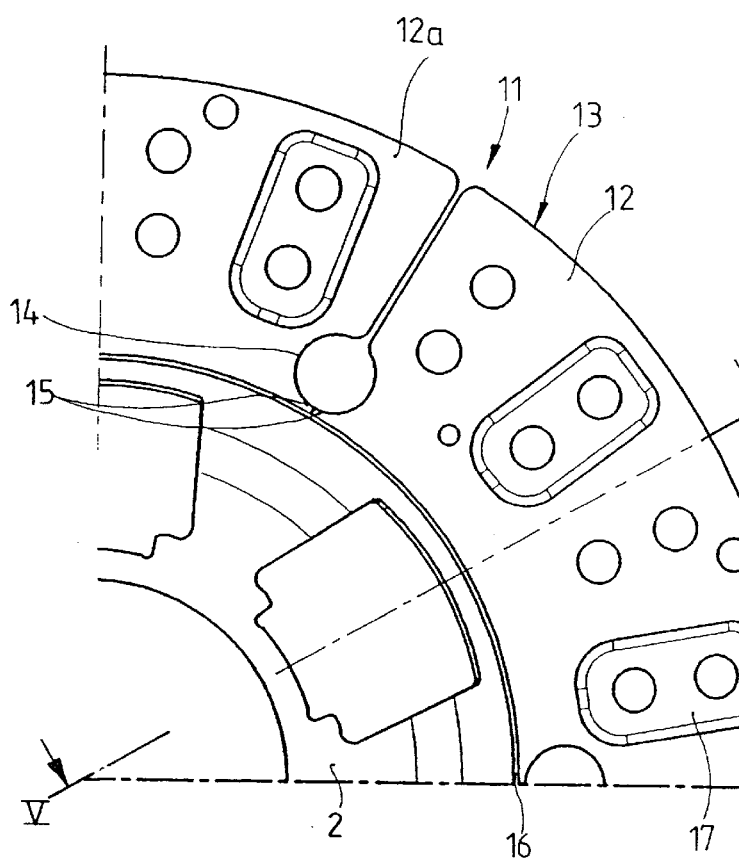
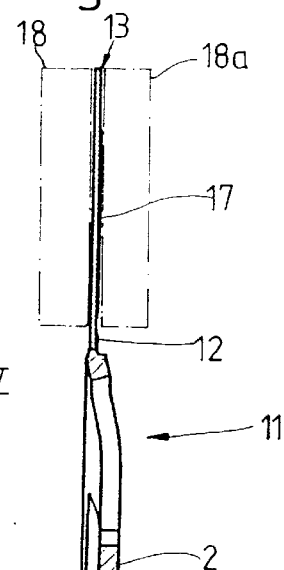
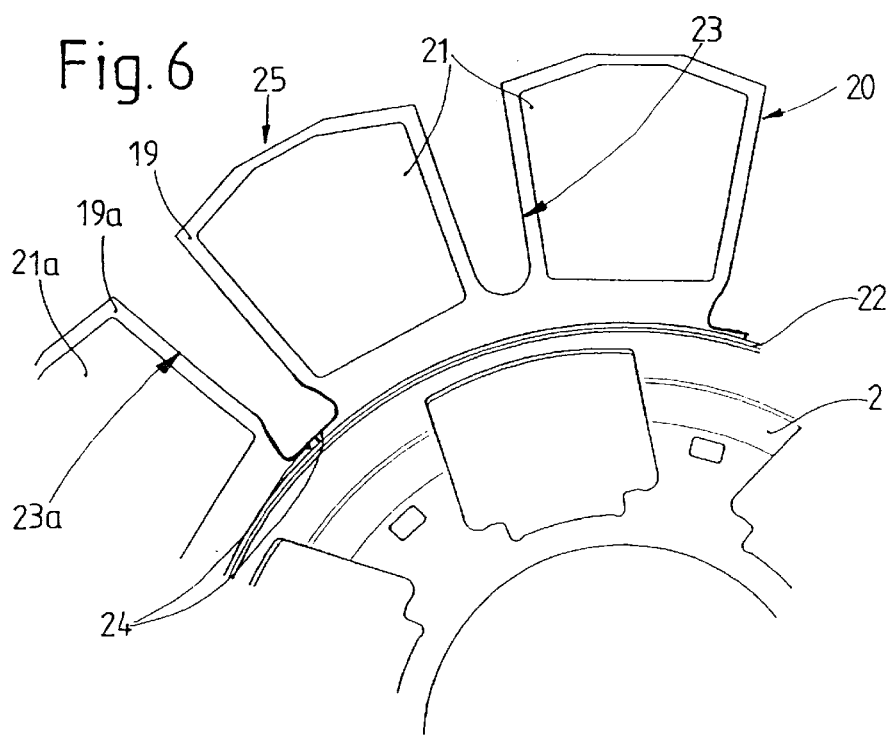

DRIVER DISK FOR A CLUTCH PLATE

BACKGROUND OF THE INVENTION

1. Field of the Invention

The invention is directed to a driver disk for a clutch plate of a motor vehicle clutch with a strengthening or reinforcement part and with a facing carrier arranged for holding friction facings, the facing carrier having a plurality of segments fastened to the outer circumference of the reinforcement part via a material engagement.

2. Description of the Related Art

A driver disk for a motor vehicle friction clutch is disclosed, for example, in German reference DE 43 35 674 A1. The driver disk disclosed in this reference has a reinforcement part made of sheet metal and a facing carrier arranged on the reinforcement part and includes a plurality of segments. The reinforcement part has a thickness greater than that of the facing carrier arranged thereon. The reinforcement part also has an axial stop and a centering collar for the segments of the facing carrier. During assembly, the segments are pretensioned against the stop and centering collar when the driver disk is mounted. The segments are then welded with the reinforcement part and with one another. This assembly procedure prevents large gaps from forming between the reinforcement part and the facing carrier which must be bridged by welding material during welding. The procedure results in low welding distortion and, therefore, in low expenditure on straightening after the driver disk is assembled.

When the driver disk is mounted in the clutch, the weld seam between the segments is exposed to a very high shear load which may lead to tearing of the weld seam between the segments and may subsequently destroy the weld seam between the segments and the reinforcement part.

SUMMARY OF THE INVENTION

The object of the present invention is to provide a driver disk for clutch plate of a motor vehicle clutch such that it has high stability and is economical to manufacture.

This object of the present invention is met by a driver disk for a clutch plate having a reinforcement part and a facing carrier part having segments adjoining the reinforcement part in which adjacent ones of the segments loosely contact one another or are at a distance from one another in the area adjoining the reinforcement part.

The inventive arrangement allows the segments to move slightly relative to one another without exposing any weld seams to shear loading. Accordingly, the fastening of the segments to the reinforcement part is also loaded only slightly. The driver disk according to the invention accordingly has a particularly high stability. The distance between the segments may be very small and may be determined, for example, by tolerances of the segments. The connection of the segments at the reinforcement part of the driver disk according to the invention requires a particularly low expenditure compared with the material engagement of the segments at the reinforcement part of the known driver disk. The driver disk according to the invention may therefore be manufactured in a particularly economical manner. A further advantage of this arrangement consists in that the heat distortion is especially low when the material engagement is generated in the welding process. Therefore, the expenditure required for straightening the driver disk is minimized when manufacturing the driver disk according to the present invention.

The loading of the material engagement between the segments and the reinforcement part is also minimized according to an embodiment of the invention when the end areas of the segments of the regions adjoining the reinforcement part are constructed elastically.

The reinforcement part of a disk typically has areas with windows provided for receiving springs of a torsional vibration damper. These areas with windows are weakened because of the windows. According to another advantageous further development of the invention, these areas may be strengthened in a particularly simple manner when the segments are constructed so as to be wider than windows for a torsional vibration damper and are arranged symmetric to the windows with respect to a radial line which passes through a center of the window.

According to another embodiment of the invention, loading of the end areas of the material-engagement connection between the segments and the reinforcement part is minimized when the end areas of the segments contacting the reinforcement part taper to form slender tongues.

The end areas of the material-engagement connection are further relieved when the taper of the segments has a radius in edge areas of the segments adjoining the tongues.

According to a further embodiment of the invention, high elasticity of the segments in their areas adjoining the reinforcement part is achieved when neighboring segments form a common round recess in their areas adjoining one another.

The assembly of the driver disk according to the present invention is facilitated when the segments are arranged asymmetrically about the reinforcement part and/or have mounting pins.

A particularly small expenditure with respect to construction is required to achieve a high degree of comfort in engaging the clutch provided with the driver disk according to the present invention when each of the segments has a facing spring. The facing springs enable axial movement of friction facings mounted on the facing carrier.

A particularly uniform pretensioning of the friction facings away from the facing carrier may be produced according to another embodiment of the invention in that each of the segments has a plurality of facing springs.

According to a further embodiment of the invention, the facing springs are constructed as raised portions or protuberances incorporated in the segments.

The driver disk according to the present invention exhibits high stability when each of the friction facings arranged on the facing carrier is fastened to two segments. This construction also results in a particularly uniform transmission of torque from the friction facings to the driver disk.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 4 is a top view of a partial area of another embodiment of the driver disk according to the present invention including facing springs;

FIG. 5 is a sectional view of the driver disk in FIG. 4 along line V—V; and

FIG. 6 is a top view of a partial area of another embodiment of the driver disk according to the present invention including friction facings.

DETAILED DESCRIPTION OF THE PRESENTLY PREFERRED EMBODIMENTS

Figure 1:
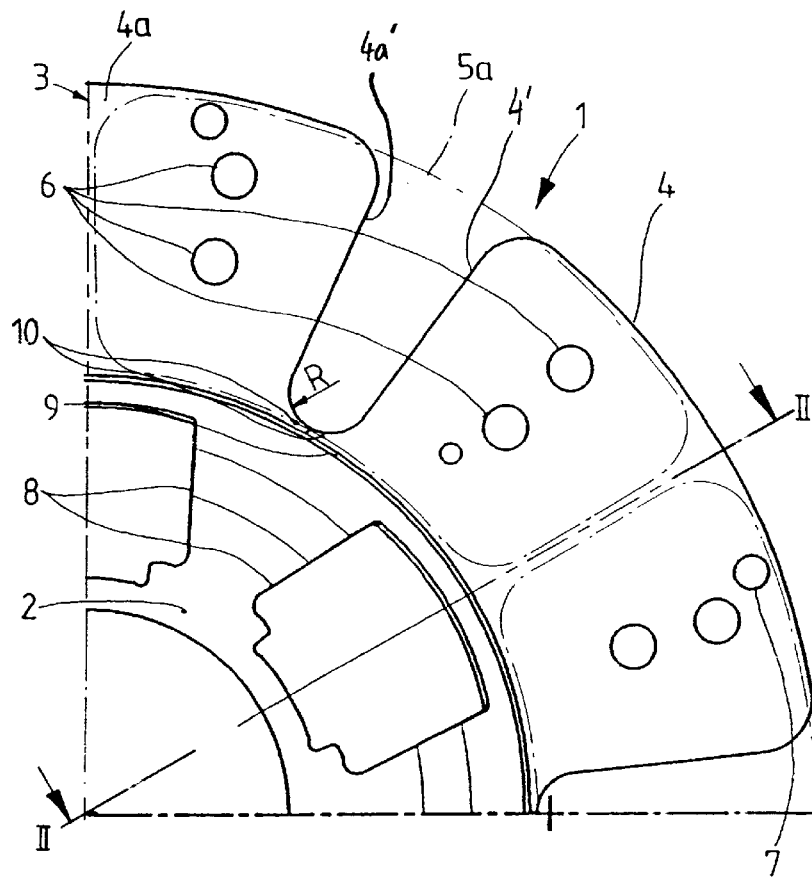
FIG. 1 is a top view of a partial area of a driver disk according to an embodiment of the present invention.

FIG. 1 is a top view showing a partial area of a driver disk 1 for a clutch plate according to an embodiment of the present invention. The driver disk 1 includes a reinforcement part 2 constructed as a hub part and a facing carrier 3 fastened to the reinforcement part 2. The facing carrier 3 has a plurality of segments 4, 4a arranged for holding friction facings 5, 5a which are represented in dash-dot lines. Each of the friction facings 5, 5a extends along partial areas of two adjacent ones of the segments 4, 4a. For connecting the friction facings 5, 5a to the facing carrier 3, each segment 4, 4a has a plurality of bore holes 6. Each of the segments 4, 4a further includes mounting bore holes 7. The mounting bore holes 7 are arranged asymmetrically on the segments 4, 4a and accordingly enable a simple alignment of the segments 4, 4a such as, for example, for automated assembly. The reinforcement part 2 has a plurality of windows 8 for receiving torsion springs, not shown, of a torsional vibration damper. In the position shown in the drawing, the segments 4, 4a are pretensioned against the radial outer circumference of the reinforcement part 2 and welded with the latter during assembly. A weld seam 9 for fastening the segments 4, 4a by material engagement extends continuously along the entire circumference of the reinforcement part 2. Of course, the weld seam 9 may alternatively have a plurality of sections which are separated from one another.

Each circumferential end of the segments 4, 4a tapers in its area contacting the reinforcement part 2 toward a slender tongue 10 facing an adjacent one of the other segments 4, 4a. The taper of the tongue 10 passes into the outer edge 4', 4a' of the segments 4, 4a via a radius R. Two tongues 10 of adjacent segments 4, 4a are situated so that they loosely contact each other or are at a slight distance from one another. This arrangement of the tongues 10 allows each of the segments 4, 4a to be pretensioned relative to the reinforcement part in an unobstructed manner prior to the welding process. This distance between the segments is very small and is generated by tolerances in the width of the segments 4, 4a. Further, FIG. 1 shows that the segments 4, 4a are wider than the windows 8 of the reinforcement part 2 and are arranged symmetric to a radial line which passes through the center of the window. Accordingly, the area of the reinforcement part 2 that is weakened by the windows 8 is stabilized by the segments 4, 4a.

Figure 2:
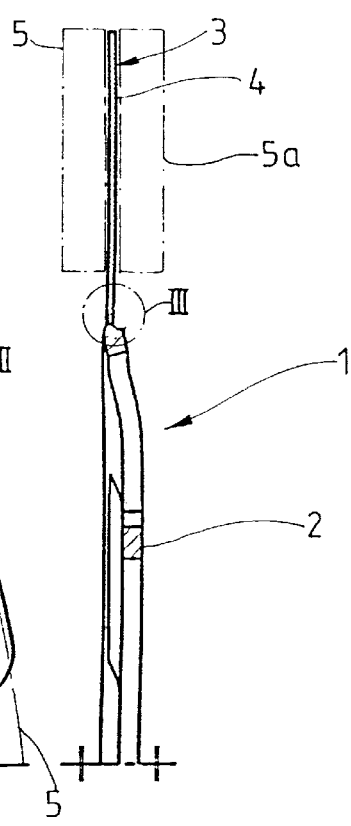
FIG. 2 is a sectional view of the driver disk from FIG. 1 along line II—II.

FIG. 2 is a sectional view along line II—II of the through the driver disk 1 which shows that the segments 4 of the facing carrier 3 are produced from a thinner sheet metal than the reinforcement part 2.

Figure 3:
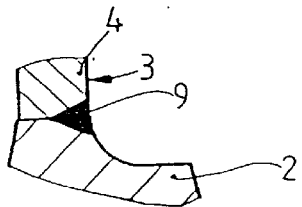
FIG. 3 is a greatly enlarged view of detail III from FIG. 2.

FIG. 3 is a greatly enlarged view of detail III from FIG. 2, which shows that a transition from the reinforcement part 2 to the adjacent segment 4 of the facing carrier 3 is rounded. The rounded portion prevents peak loads acting directly on the weld seam 9.

FIG. 4 is a top view showing a partial area of a driver disk 11 which differs from the driver disk 1 of FIGS. 1 to 3 primarily in that two adjacent segments 12, 12a of a facing carrier 13 which face one another form a round recess 14 proximate the reinforcement part 2. The recess 14 forms tongues 15 on a side of the recess 14 facing the reinforcement part 2. The tongues 15 are situated so that they loosely contact each other or are at a slight distance from one another like the tongues 10 of the driver disk 1 from FIGS. 1 to 3. The recess 14 produces an elasticity in the segments 12, 12a and thereby prevents loading of a weld seam 16 which connects the segments 12, 12a with the reinforcement part 2. Further, each of the segments 12, 12a has facing springs 17 constructed as protuberances. The facing springs 17 enable axial movement of the friction facings 18, 18a shown in dash-dot lines in FIG. 5. During axial movement of the friction facings 18, 18a, the areas of the segments 12, 12a which form the facing springs 17 deform elastically. A sectional view through the driver disk 11 is shown in FIG. 5 and reveals that all of the protuberances forming the facing springs 17 face in one axial direction. Accordingly, one of the friction facings 18 directly contacts the facing carrier 13 and the oppositely located friction facing 18a contacts the facing spring 17 of the facing carrier 13.

FIG. 6 shows a driver disk 25 according to another embodiment of the present invention with friction facings 21, 21a arranged in pairs on a segment 19, 19a of a facing carrier 20. Each of the segments 19, 19a has its own recess 23 or a shared recess 23a between the friction facings 21, 21a. The recesses 23, 23a are guided up to a weld seam 22 connecting the facing carrier 20 with the reinforcement part 2. These recesses 23, 23a add to an elasticity of the segments 19, 19a and accordingly relieve the end areas of the weld seam 22. The lateral end areas of the segments 19, 19a taper to form tongues 24 located at a slight distance from one another. The friction facings 21, 21a may, for example, be glued or baked with the segments 19, 19a. Accordingly, the segments 19, 19a with the friction facings 21, 21a may be manufactured first as a preassembly and the segments 19, 19a with the friction facings 21, 21a may then be welded with the reinforcement part 2.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed-form or embodiment of the invention may be incorporated in any other disclosed or described or suggested form or embodiment as a general matter of design choice. It is the intention, therefore, to be limited only as indicated by the scope of the claims appended hereto.

We claim:

1. A driver disk for a clutch plate of a motor vehicle clutch, comprising:

a reinforcement part having a radial outer circumference; and a facing carrier comprising a plurality of segments fastened to said radial outer circumference of said reinforcement part by a welded connection, wherein said facing carrier is arrangable for holding friction facings, and adjacent ones of said plural segments are arranged so that areas of said adjacent ones of said plural segments proximate said radial outer circumference are one of loosely contacting one another and being separated at a distance from one another for minimizing shear stress on the welded connection caused by relative movement of said adjacent ones of said plural segments, wherein adjacent ones of said plural segments comprise edge areas mutually facing one another and forming a common round recess therebetween.

2. The driver disk according to claim 1, wherein said plural segments comprise lateral end regions, wherein a portion of said lateral end regions adjoining said reinforcement part comprise an elastic construction.

3. The driver disk of claim 1, wherein said reinforcement part comprises windows arranged therethrough for receiving springs of a torsional vibration damper and said segments are arranged so that they are wider than said windows along a circumferential direction and are arranged symmetric with said windows.

4. The driver disk of claim 1, wherein said plural segments are at least one of arranged asymmetrically and arranged with mounting pins for facilitating assembly of said plural segments.

5. The driver disk of claim 1, wherein each of said plural segments comprises a facing spring.

6. The driver disk of claim 5, wherein said facing springs comprise protuberances incorporated into said plural segments.

7. The driver disk of claim 1, wherein each of said plural segments comprises a plurality of facing springs.

8. The driver disk of claim 7, wherein said facing springs comprise protuberances incorporated into said plural segments.

9. The driver disk of claim 1, further comprising friction facings arranged on said facing carrier, wherein each of said frictions facings is fastened to two of said plural segments.

10. The driver disk of claim 1, wherein said welded connection comprises a welded seam.

11. A driver disk for a clutch plate of a motor vehicle clutch, comprising:

a reinforcement part having a radial outer circumference; and a facing carrier comprising a plurality of segments fastened to said radial outer circumference of said reinforcement part by a welded connection, wherein said facing carrier is arrangable for holding friction facings, and adjacent ones of said plural segments are arranged so that areas of said adjacent ones of said plural segments proximate said radial outer circumference are one of loosely contacting one another and being separated at a distance from one another for minimizing shear stress on the welded connection caused by relative movement of said adjacent ones of said plural segments, wherein each of said plural segments comprises end areas in a region contacting said reinforcement part, wherein each of said end areas comprises a taper forming a slender tongue.

12. The driver disk of claim 11, wherein said plural segments comprise edge areas at said end areas and said taper of said plural segments has a radius and joins at said edge areas adjoining said tongues.

13. The driver disk of claim 11, wherein said welded connection comprises a welded seam.

* * * * *